United States Patent [19]
Tiemann et al.

[11] Patent Number: 5,568,301
[45] Date of Patent: Oct. 22, 1996

[54] OPTICAL COMMUNICATION SYSTEM WITH SECURE KEY TRANSFER

[75] Inventors: Jerome J. Tiemann, Schenectady; John E. Hershey, Ballston Lake, both of N.Y.; Amer A. Hassan, Cary, N.C.

[73] Assignee: General Electric Company, Schenectady, N.Y.

[21] Appl. No.: 415,877

[22] Filed: Apr. 3, 1995

[51] Int. Cl.⁶ .................................................. H04J 14/08
[52] U.S. Cl. ......................... 359/140; 359/152; 380/54
[58] Field of Search ................................ 359/113, 129, 359/136, 140, 143, 152, 159, 173, 564; 380/35, 54, 21; 250/227.12

[56] References Cited

U.S. PATENT DOCUMENTS 5,164,986  11/1992  Bright ........................................ 380/21
5,410,147  4/1995  Riza et al. .......................... 250/214 LS

OTHER PUBLICATIONS

Amer A. Hassan et al., "Spatial Optical CDMA", IEEE Journal on Selected Areas in Communications, vol. 13, No. 3, Apr. 1995, pp. 609–613.

Nabeel A. Riza et al., "Signaling System for Multiple-Access Laser Communications and Interference Protection", Applied Optics, vol. 32, No. 11, 10 Apr. 1993, pp. 1965–1972.

Townsend et al, "Design of quantum cryptgraph systems for passive optical networks", Electronics Letters vol. 30, No. 22, 27th Oct. 1994. pp. 1875–1877.

Townsend, "Sewre key distribution system based on quantum cryptograhy", Electronics Letters, 12th May 1994, vol. 30, No. 10. pp. 809–811.

Primary Examiner—Wellington Chin
Assistant Examiner—Kinfe-Michael Negash
Attorney, Agent, or Firm—Donald S. Ingraham; Marvin Snyder

[57] ABSTRACT

An optical communication system includes a first and a second optical communication assembly that are coupled together via an optical coupling medium. Each optical communication assembly includes a respective time delay unit; an optical pattern imager coupled to the time delay unit; a respective transmission-reception apparatus coupled to the time delay unit; and a respective optical signal generator coupled to the time delay unit for passing a pulse of coherent light into the time delay unit. The optical pattern imager in each optical communications assembly is disposed to receive an interference fringe pattern that corresponds to the respective phase shifts introduced by both the transmitting and receiving optical communications assemblies. The position of the interference pattern with respect to a reference standard on the imager provides a signal for a code-key data signal.

30 Claims, 2 Drawing Sheets

OPTICAL COMMUNICATION SYSTEM WITH SECURE KEY TRANSFER

BACKGROUND OF THE INVENTION

This invention pertains to optical communication systems in general and in particular to the generation and exchange of code key information to enable the transmission of information in a secure manner between stations in a communications system.

Secure communications typically involve the transmission of a coded signal between a transmitting station and a receiving station. Each station must possess and use the same key for decoding (or deciphering) the transmitted signal for the communications system to be effective. The existence of predetermined code keys presents potential problems with regard to compromise of the key. Further, even if the code key is not compromised, improper use by an operator can negate the ability to transfer information in a secure manner.

It is desirable to maintain the security of a communication system by minimizing the possibility that an unauthorized user can obtain or otherwise determine the code key being used to encode transmissions on the system. It is further desirable that such code keys be randomly generated and uniquely known only to the transmitter and receiver of the information.

SUMMARY OF THE INVENTION

In accordance with this invention, an optical communication system is adapted for the secure exchange of code key information between spatially separated stations and includes a first and a second optical communication assembly that are coupled together via an optical coupling medium. Each optical communication assembly comprises a respective time delay unit; an optical pattern imager coupled to the time delay unit; a respective transmission-reception apparatus coupled to the time delay unit; and a respective optical signal generator coupled to the time delay unit for passing a pulse of coherent light into the time delay unit. Each time delay unit includes a pair of beamsplitters and a delay path apparatus optically coupled together such that a portion of the light pulse entering the time delay unit passes through the unit to provide an undelayed or primary pulse, and a portion of the optical signal passes along a delay path through the delay path apparatus before passing from the time delay unit, thereby providing an optical output signal having two pulses and in which the time delay between the primary pulse and the time-delayed pulse corresponds to the optical phase shift introduced by the time delay unit. Typically, the length of the delay path in each time delay unit is different. The transmission-reception apparatus comprises optical control components for passing the optical output signal from one communications assembly to another through free space, optical fibers, or other optical coupling media.

The optical pattern imager in each optical communications assembly is disposed to receive an interference fringe pattern resulting from the combination, within the respective time delay unit of the receiving optical communication assembly, of the phase delayed pulse of the transmitting optical communication assembly and the primary pulse of the transmitting assembly as phase delayed in the receiving assembly's time delay unit. The interference pattern generated thus corresponds to the respective phase shifts introduced by both the transmitting and receiving optical communications assemblies. The position of the interference pattern with respect to a reference standard on the imager provides a signal for a code-key data signal. Exchange of optical signals between two optical communications assemblies provides identical, yet unique and random, code-key data signals from which a key can be formed to enable secure communications between the two stations.

A method of secure exchange of a code key in such a communication system as described above includes the steps of generating in each of the first and second optical communication assemblies a code-key interference pattern corresponding to the combination in an optical signal of the respective phase shifts introduced by the first and the second optical communication assemblies, and then generating in each respective optical communication assembly a code key data value corresponding to the spatial relation on an imager of the code-key interference pattern with respect to a reference standard. The step of generating the interference pattern includes the steps of generating a first assembly output optical signal that comprises a primary pulse and a time-delayed pulse (the time delay corresponding to the optical phase delay); processing the received first assembly output signal in the second optical communication assembly so as to generate the code-key interference pattern on the second communication assembly optical pattern imager, the code-key interference pattern corresponding to the combination of the respective time delays introduced in the first and the second optical communication assemblies; generating a second assembly output optical signal that comprises a primary pulse and a time-delayed pulse; and processing the received second assembly output signal in the first optical communication assembly so as to generate the same code-key interference pattern on the first communication assembly optical pattern imager. A code-key value is then generated that corresponds to the spatial relation on the respective imagers of the position of the optical interference pattern with respect to a reference standard on the imager.

BRIEF DESCRIPTION OF THE DRAWINGS

The features of the invention believed to be novel are set forth with particularity in the appended claims. The invention itself, however, both as to organization and method of operation, together with further objects and advantages thereof, may best be understood by reference to the following description in conjunction with the accompanying drawings in which like characters represent like parts throughout the drawings, and in which:

DETAILED DESCRIPTION OF THE INVENTION

Figure 1:
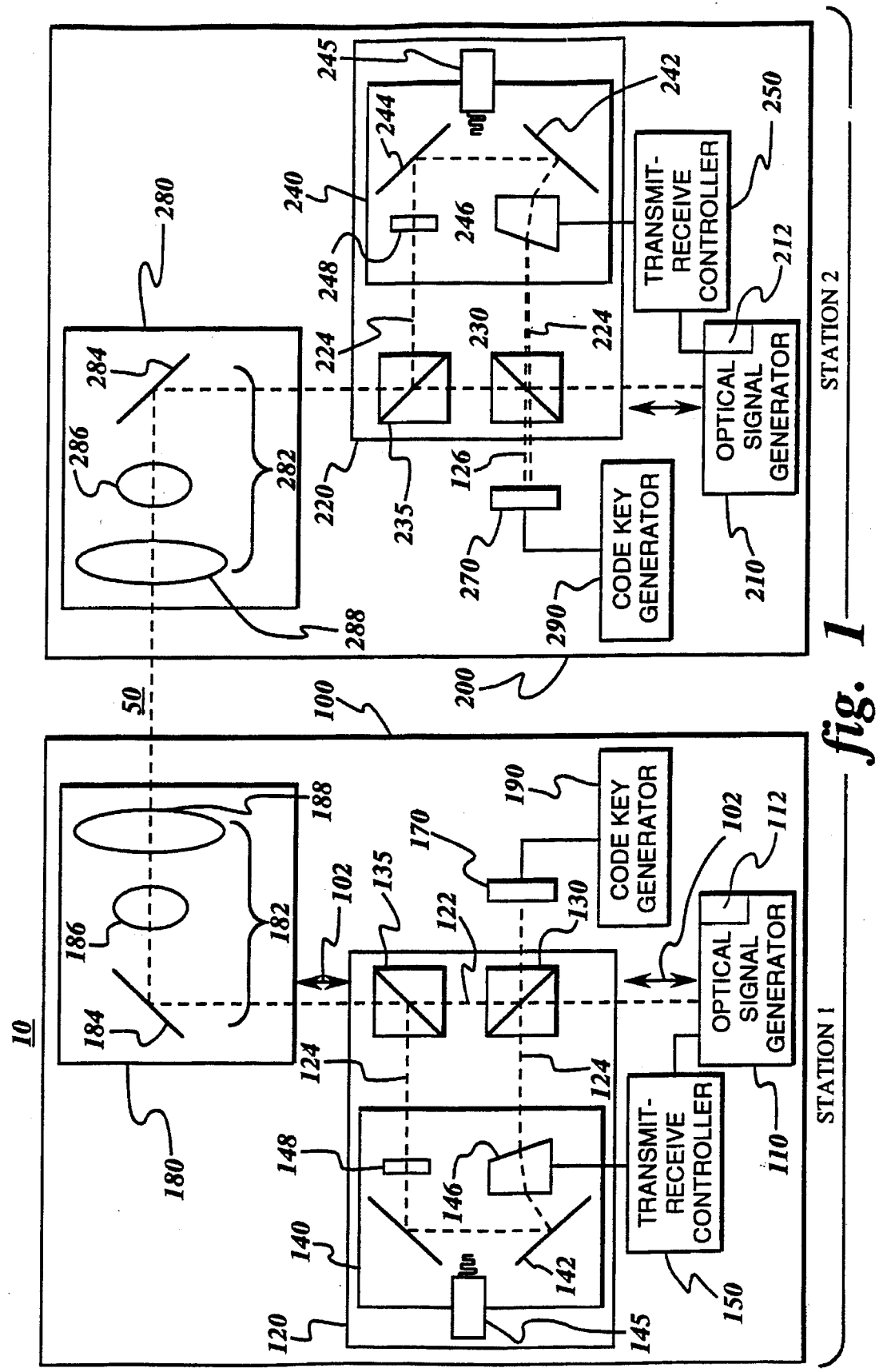
FIG. 1 is a partial block diagram and partial schematic diagram of an optical communications system in accordance with one embodiment of the present invention.

An optical communication system 10 (FIG. 1) comprises a first optical communications assembly 100 disposed at a first station and a second optical communications assembly 200 disposed at a second station that is spatially separated from the first station with an optical coupling medium 50 disposed therebetween. As used herein, "station" and the like refers to respective operating sites for users of the communications system 10 that are adapted, as described below, to exchange code-key information in order to establish secure communications between the two stations. Communications system 10 may comprise multiple stations, of which any two can exchange code key information described below. By way of example and not limitation, the structure and operation of communication system 10 is described below with respect to two representative stations having respectively first and second optical communications assemblies 100, 200. "Code-key" and similar expressions as used herein refer to data values or bits of information that are used to build or identify a key to be used for secure exchange of information.

Each optical communications assembly 100, 200 is functionally identical; for purposes of describing this invention, a detailed description of communication assembly 100 is provided, with communication assembly 200 having corresponding parts (and corresponding identification numbers beginning with a "2_" in the figures).

Figure 2:
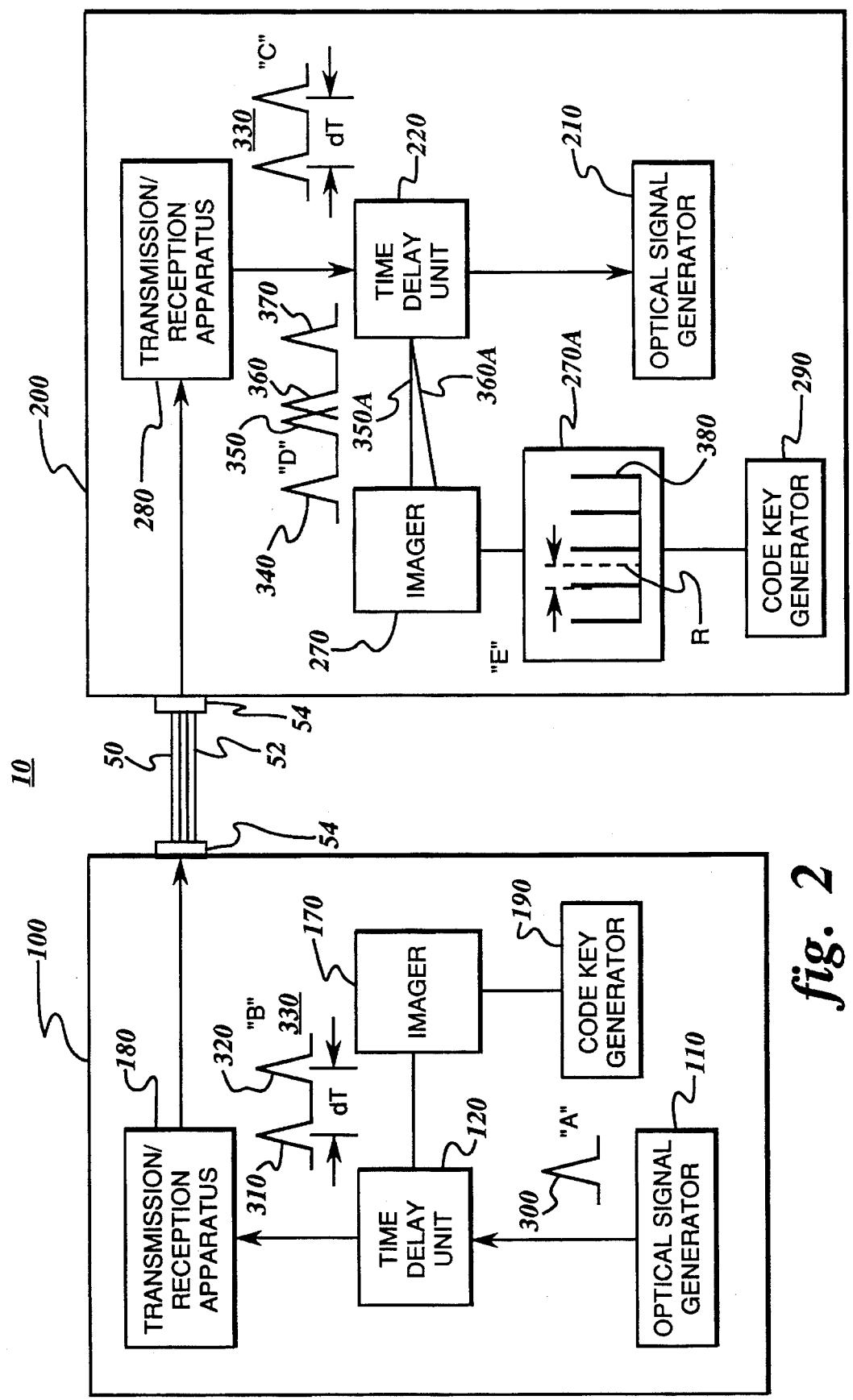
FIG. 2 is a block diagram of an optical communications system in accordance with another embodiment of the present invention.

Optical communications assembly 100 comprises an optical signal generator 110 that is optically coupled to a time delay unit 120; optical time delay unit 120 is further optically coupled respectively to an optical pattern imager 170 and a transmission-reception apparatus 180. As used herein, "optically coupled" and the like refer to components between which optical signals can be passed in a manner that maintains the integrity of the signal sufficiently such that information contained therein is determinable in the receiving component. For example, optical signals are typically passed through free space or through optical fibers. Distortion or blockage of the optical signal to the point at which the signal is not separable from noise at the receiving component is typically a greater problem when passing the signal though optical coupling medium 50 between stations. Optical coupling medium typically comprises freespace; for freespace transmission through the atmosphere issues such as distance between stations and weather phenomena (e.g., rain, snow, dust, and the like) can degrade the quality (or integrity) of the signal. No limitation is implied herein relating to the distance the optical signal must pass through optical medium 50. Alternatively, optical coupling medium 50 comprises fiber optic cable (as illustrated in FIG. 2) or the like in which the optical signal passed between stations is confined within an optically transmissive guide.

Optical signal generator 110 typically comprises a laser (not separately shown) (such as a diode pumped solid state) laser that is adapted to generate discrete pulses of coherent light. As used herein, "discrete pulse" and the like refers to pulses having a duration in the range between 10 picoseconds and 10 nanoseconds. Functionally, the pulse length should be shorter than the time delay (in time delay unit 120) but long enough to obtain fringes across the fringe detector (that is, imager 170). The wavelength of coherent light pulses generated by signal generator 110 is typically in the range between about 2 micron and 500 nm. The amplitude of the generated pulse is further typically controllable so that the pulse generated provides sufficient signal strength for effective transmission between the first and second stations. Optical signal generator 110 typically further comprises an amplifier module having an injection locked oscillator 112, or alternatively just an injection locked oscillator, so that the pulse generated by the laser can correspond in wavelength to a pulse received by first optical communications assembly 100 from another optical communications assembly.

Optical time delay unit 120 is disposed so as to be optically coupled to signal generator 110 and to transmission-reception apparatus 180. Time delay unit comprises a first beamsplitter 130 and a second beamsplitter 135 that are optically coupled together and to a delay path apparatus 140.

The pair of beamsplitters 130, 135 are disposed such that a portion of the light incident on first beamsplitter 130 from signal generator 110 passes along a direct path 122 through time delay unit 120 and a portion of the light passes along a delay path 124. Direct path 122 is aligned with a first axis 102, which lies in the plane of the illustration in FIG. 1.

As illustrated in FIG. 2, first and second beamsplitters 130, 135 are disposed such that, when assembly 100 is operated in the transmit mode (that is, an optical signal is generated to be transmitted from first assembly transmission-reception apparatus 180 to another station), a portion of a light pulse emanating from signal generator 110 passes through both first and second beamsplitters 130, 135 undeflected along direct path 122 and thence out of time delay unit 120 along first axis 102 (this signal being referred to as a primary pulse or alternatively a transmit undelayed signal). Another portion of a light pulse incident on first beamsplitter 130 is deflected onto delay path 124 and into delay path apparatus 140 (this optical signal being referred to as a transmit time-delayed signal).

Delay path apparatus 140 typically comprises a first and a second optical deflector 142, 144, such as a mirror or the like, that are disposed to direct the light along delay path 124 as illustrated in FIG. 1 and back into second beamsplitter 135. Light passing from delay path 124 into second beamsplitter 135 is deflected out of time delay unit 120 along first axis 102 towards transmission-reception apparatus 180. Delay path apparatus further comprises an optical path director 146 that is disposed along delay path 124 so as to selectively, in response to an applied control signal, determine the optical path between first beamsplitter 130 and first reflector 142. For example, in the transmit mode, light deflected onto delay path from first beamsplitter 130 emanates from first beamsplitter 130 orthogonal to first axis 102 (e.g., the path on which the light entered first beamsplitter 130 from signal generator 110). By way of example and not limitation, as illustrated in FIG. 1, this light passing orthogonally from first beamsplitter 130 enters optical path director 146 and is deflected so as to be incident on first deflector 142 at such an angle that the light is then deflected to second deflector 144. Delay path apparatus 140 is further adapted such that when assembly 100 is operated in the receive mode, optical path director 146 is controlled so that the optical path between first deflector 142 and first beamsplitter 130 is modified slightly for a light pulse passing through time delay unit 120 in the opposite direction of a transmit pulse of light. The modification of the optical path provides for the generation of an optical interference pattern on optical pattern imager, as described more fully below.

Optical path director 146 typically comprises a variable prism in which the deflection angle of light passing therethrough can be changed in correspondence with an applied control signal. For example, optical path director 146 comprises an electro-optic material such as lithium niobate or the like that is optically coupled in delay path 124 between first beamsplitter 130 and first deflector 142, and is electrically coupled to and responsive to control signals generated by a transmit-receive controller 150. The electrical control signal applied to the lithium niobate piezoelectric material results in a change in the index of refraction of the material comprising the prism and hence light passing through the prism is deflected at an angle corresponding to the applied control signal. This angle of deflection is selected (by the application of an appropriate control signal) to provide a desired optical path for either transmit or receive operation of communication assembly 100. Use of such a lithium niobate material prism is desirable due to its rapid response to an applied electrical signal, the change in index of refraction of the prism being effected within nanoseconds of application a particular control signal to optical path director 146. Alternatively, optical path director 146 may comprise a mirror positioning mechanism (not shown) coupled to first deflector 142 so as to selectively position deflector 142 at an angle with respect to delay path 124 to provide the desired optical delay path for transmit and receive operation of communication assembly 100. Such a positioning mechanism comprises, for example, a piezoelectric actuator mechanically coupled to first deflector 142 so as to selectively position deflector 142 in response to an applied control signal from transmit-receive controller 150 so as to provide the desired optical pathway in delay path apparatus 140.

The length of the delay path determines the time delay between the pulse passing along direct path 122 and the pulse passing along delay path 124. This time delay can also be expressed as the phase shift of the time delayed light pulse with respect to the undelayed light pulse. The typical length of delay path 124 is such that it does not introduce a phase shift greater than one wavelength of the light passing through delay path apparatus 140. For example, for light having a wavelength in the range of 600 nm to 900 nm, as might be generated by a titanium doped sapphire laser, the length of delay path 124 is in the range of few millimeters (e.g., less than 10 mm) to a few centimeters (e.g., less than 10 cm) so as to introduce time delays in the range of about 10 ps to 100 ps. Since the phase shift of the light repeats itself every time an additional wavelength is added to the path, all possible phases are selectable with only a small change in time delay path length.

Delay path apparatus 140 further typically comprises an adjustment mechanism 145 by which the length of delay path 124 can be changed, such as by changing the respective distances of first and second deflectors 142, 144 from first and second beamsplitters 130, 135. Adjustment mechanism 145 typically comprises a screw-type (or micrometer-type) mechanism that is adapted to precisely position deflectors 142 and 144 at a selected position with respect to first and second beamsplitters 130, 135. The range of adjustment is typically of a magnitude in the range of about 10 wavelengths of the light processed in communication assembly 100 (e.g., the light that can be generated by signal generator 110). Alternatively, adjustment mechanism 145 may comprise a thermal expansion apparatus having material of a known thermal expansion coefficient coupled to a heat source (e.g., a thermoelectric device) that is responsive to control signals applied thereto such that selective application of signals to the heat source results in a predetermined expansion or contraction of the material with the known thermal expansion coefficient so as to provide a desired lengthening or shortening of delay path 124.

Alternatively, or in addition to adjustment mechanism 145, delay path apparatus 140 further comprises a delay path reset device 148 that is disposed along delay path 124 so as to provide an operational optical phase adjustment capability for operating communication assembly in sequential iterations as described more fully below. Delay path reset device 148 typically comprises an optical phase shifter such as a liquid crystal cell or the like that can, in response to a control signal (e.g., from transmit-receive controller 150 or other control device) cause a phase shift in light passing therethrough.

The arrangement of first and second beamsplitters 130, 135 described above further provides that, when assembly 100 is operated in the receive mode (that is, the pulses of light comprising an optical signal enter communication assembly via transmission-reception apparatus 180 and pass into time delay unit 120), light entering time delay unit 120 from transmission-reception apparatus 180 is incident on second beamsplitter 135. A portion of this light incident on second beamsplitter 135 passes undeflected into first beamsplitter 130 (referred to as a receive direct path signal). Another portion of the signal incident on second beamsplitter 135 is deflected into delay path 124 (referred to as the receive delay path signal). The receive delay path signal passes from delay path 124 and is incident on first beamsplitter 130, as illustrated in FIG. 1. First beamsplitter 130 is disposed such that a portion of the receive direct path signal is deflected along an interference path 126 towards imager 170, and a portion of the receive direct path signal passes through first beamsplitter 130 undeflected towards optical signal generator 110. Similarly, a portion of the receive delay path signal incident on first beamsplitter 130 passes undeflected through the first beamsplitter towards imager 170 and another portion is deflected in first beamsplitter 130 towards optical signal generator 110.

Imager 170 typically comprises an array of photosensors, such as photodiodes or the like, that are disposed in a pattern so as to generate electrical signals corresponding to the spatial pattern and intensity of light incident on the imager. Imager 170 is optically coupled to first beamsplitter 130 and disposed so that the receive direct path light signal and the receive delay path light signal passing from first beamsplitter 130 are incident on the array of photosensors of imager, but at slightly different angles of incidence so that the combination of the two beams results in a fringe interference pattern. The spatial nature of the interference fringe pattern resulting from the combination of these two light signals is detectable by the photosensors in imager 170 and converted to corresponding electrical signals which are coupled to a code key generator 190 in which the electrical signals are processed as described more fully below with respect to the operation of communications system 100.

Transmission-reception apparatus 180 is optically coupled to second beamsplitter 135 along first axis 102. Apparatus 180 thus is disposed to receive, when first communications assembly 100 is operated in the transmit mode, the transmit-undelayed light pulse and the transmit-timedelayed light pulse passing from time delay unit 120. Transmission-reception apparatus 180 comprises beam coupling optics 182 disposed to couple the optical signal passing therethrough between communications assembly 100 and the optical coupling medium 50 that is disposed between first communications assembly 100 and second communications assembly 200. For example, as illustrated in FIG. 1, beam coupling optics 182 comprise telescopic optics, that is, optics that expand the spatial extent of the optical signal passing from time delay unit 120 so that it can be effectively passed through free space optical coupling medium 50 to second communications assembly 200. Telescopic optics 182 comprise, for example, a reflector 184 and lenses 186, 188 that are disposed such that an optical signal comprising a beam with a relatively narrow spatial beamwidth (e.g., about 1 mm to about 5 mm, as might be commonly used in time delay unit 120) is converted into a beam with a spatial beamwidth on the order of 1 meter or more. Conversely, telescopic beam coupling optics 182 reduce the spatial extent of an optical signal received from optical coupling medium 50 (e.g., a beam transmitted from another station to the station of first communications assembly 100) and reduce the received beam to have a spatial beamwidth compatible with processing in time delay unit 120.

Alternatively, as shown in FIG. 2, optical coupling medium 50 comprises an optical guide such as fiber optic cable 52 or the like. In such a case, transmission-reception apparatus 180 comprises optical components (such as lenses and the like, not separately shown) which narrow the spatial extent of the beam and focus it on a lenslet array 54 for coupling the optical signal into fiber optic cable 52.

As noted above, second communication assembly 200 comprises the same components and structure as first communications assembly and thus is not separately described in detail. One difference between first assembly time delay unit 120 and second time delay unit 220 is the length of the delay path; typically respective communication assemblies in optical communication system 10 each comprise time delay units having delay paths of respective different lengths. Typically each respective communication assembly in communication system 10 (two representative assemblies 100, 200, being illustrated in FIG. 1) comprises a time delay unit having a delay path length that is unique to that communication assembly such that each respective communication assembly in communication system 10 introduces a unique phase shift to light passing through its respective time delay unit.

In operation, secure exchange of code key information between two stations having respective optical communications assemblies 100, 200 (FIG. 2)is accomplished by generating in each optical communication assembly a code-key interference pattern that corresponds to the combination of a first optical communication assembly phase shift and a second optical communication assembly phase shift, and generating in each optical communication assembly the identical code key data value that corresponds to the spatial relation on respective assembly imagers 170, 270 of the code-key interference pattern with respect to a common reference standard.

For purposes of illustration and not limitation, operation of optical communications system 10 is described in detail below for the situation in which optical communication assembly 100 is in the transmit mode and communication assembly 200 is in the receive mode. When first communications assembly operates in the receive mode and second communication assembly operates in the transmit mode, operation of the system is similar as the transmit and receive operating regimes for each communications assembly are the same.

Optical signal generator 110 generates a single pulse of coherent light having a frequency and pulse width that is appropriate for processing as described herein in communication assemblies 100 and 200. Graphic illustration "A" in FIG. 2 depicts (graphically as amplitude vs time) a pulse of light 300 passing from signal generator 110 into time delay unit 120. The light pulse emanating from signal generator 110 passes into time delay unit 120 in which part of the pulse is directed along the direct path and part of the pulse is directed along the delay path. In the transmit regime, transmit-receive controller 150 generates control signals to be applied to optical path deflector 146 such that the deflection of light passing therethrough enables the light pulse entering the delay path from first beamsplitter 130 to be directed along delay path 124 so that it passes into second beamsplitter 135.

As a consequence, two light pulses pass from time delay unit 120 to transmission-reception apparatus 180, as depicted in graphic illustration "B". The first pulse depicted in illustration "B" represents a primary pulse 310, that is the light pulse that passed through time delay unit 120 undelayed. The second pulse depicted in illustration "B" represents a time delayed pulse 320, that is, the portion of the light pulse that passed along the delay path; the time difference "dT" between the two pulses is a function of the length of the delay path in time delay unit 120 and further corresponds to the phase shift in the light of the delay pulse 320 with respect to primary pulse 310. Primary pulse 310 and time delay pulse 320 comprise a first assembly output optical signal 330 that is transmitted from first optical communication assembly 100 to second optical communication assembly 200 via optical guides 52. As noted above, first assembly output optical signal 330 may alternatively be transmitted via free space to the receiving station.

The transmitted first assembly output optical signal 330 is received in second optical communication assembly 200 via respective transmission-reception apparatus 280, which passes the signal, depicted in graphic illustration "C" in FIG. 2, to second assembly time delay unit 220. Each respective pulse of first assembly output optical signal 330 passes into second assembly time delay unit 220 and is processed as follows: for each pulse, a portion is directed along the direct path and a portion is directed along the delay path of time delay unit 220. Time delay unit 220 is coupled via its respective first beamsplitter 230 (FIG. 1) to its respective assembly pattern imager 270 (FIG. 2) and to its respective assembly signal generator 210; for the purposes of the present description, the signal passing from time delay unit 220 to imager 270 is addressed, although identical signals pass to signal generator 210.

The signal passing from time delay unit 220 is depicted in graphic illustration "D" in FIG. 2. The first pulse depicted is a direct path-primary pulse, that is, primary pulse 310 of first assembly optical output signal that passed through time delay unit 220 along the direct path. For purposes of illustration and not limitation, the second pulse depicted comprises a direct path-time delayed pulse 350, that is, time delayed pulse 320 of first assembly optical output signal that passed along the direct path of time delay unit 220. In this example, the third pulse depicted comprises a delay path-primary pulse 360, that is, primary pulse 310 of first assembly optical output signal that passed along the delay path of time delay unit 220. The fourth pulse depicted comprises a delay path-time delay pulse 370 which is time delayed pulse 320 of the first assembly optical output signal that passed along the delay path of time delay unit 220. For purposes of this example, it is assumed that the time delay path of second assembly time delay unit 220 is longer than the delay path of first assembly time delay unit 120, hence the relative temporal positions of pulses 350 and 360; if the time delay path of second assembly time delay unit 220 is shorter than that of first assembly time delay unit 120, the relative temporal position of pulses 350 and 360 in graphic depiction "D" would be reversed, that is, delay path-primary pulse 360 would pass from time delay unit 220 prior to direct path-time delayed pulse 350.

The respective lengths of delay paths in each optical communication assembly time delay unit in communications system 10 are chosen such that direct path-time delayed pulse 350 and delay path-primary pulse 360 emerge from the receiving assembly's time delay unit substantially temporally coincident, that is, within a period less than the coherence time of the laser. Typically, the pulses should be coincident within about 10 picosecond so as to be combined to form an interference fringe pattern on pattern imager 270. The interference fringe pattern results from the temporal and spatial combination of pulses 350 and 360. The spatial combination refers to the direction of the respective beams along slightly different length paths (e.g., the difference in distance of the paths of pulses 350 and 360 between first beamsplitter 250 and imager 270 being within a few wavelengths). Representative respective paths of pulses 350 and 360 are illustrated in FIG. 2 as items 350A and 360B, respectively (interference path 126 refers collectively to the respective paths of beams between the first beamsplitter and respective imager). The difference in paths is provided by the deflecting the light passing along the delay path; in the receive mode, second assembly transmit-receive controller 250 (FIG. 1) generates control signals that are applied to optical path director 246 to cause the desired deflection and generate the desired interference fringe pattern on imager 270. Typically the respective paths of pulses 350 and 360 differ in length by only a few wavelengths, which is sufficient to provide the interference pattern. For example, for light of a wavelength of 1 micron, this difference in length corresponds to a difference in the angle of incidence of the two respective beams on imager 270 in the range between about 0.5 mrad and 5 mrad. This angle is determined by the deflection imparted by the respective time delay unit optical path director (variable prism) to the delay path signal.

An example of an interference fringe pattern generated by the combination of direct path-time delayed pulse 350 and delay path-primary pulse 360 on imager 270 is illustrated in graphic depiction "E" of FIG. 2. Imager 270 comprises a reference standard "R", such as a grid reference in the plane of sensor pixels. The interference fringe pattern comprises several interference nulls 380, that is dark lines in the plane of the imager, separated by brighter areas. The spacing between the respective dark lines and bright areas is a function of the angle between pulses 350 and 360 incident on imager 270; the position of a given null line 380 with respect to a reference grid point (or line of reference)is unique to the combination of phase shifted signal 350 from first assembly time delay unit 120 and phase shifted signal 360 from second assembly time delay unit 220. Another time delay unit having a different delay path length would provide a fringe pattern having a different spatial relationship with respect to the imagers reference standard, and even a communication assembly having a time delay unit with the same delay path length could not consistently provide an interference fringe pattern with the same spatial relationship with respect to the imager reference standard unless all conditions (e.g., distance, atmospheric conditions for free space transmissions, and the like)in the optical medium between the first and second stations is exactly the same.

Imager 270 is coupled to code key generator 290 such that electrical signals corresponding to the spatial relationship of the detected interference fringe pattern to the imager reference standard are processed in code key generator 290 to provide random code key data values from which a code key can be constructed. For example, the fringe pattern on the detector can be fit to a sinusoid, and the location of the minima can be determined and digitized using as many bits as can be reliably guaranteed to be correct. Since one fringe pattern may not produce sufficient bits to provide a secure key, additional bits can be determined by resetting the optical phase delay to a new random setting and repeating the exchange process.

In further operation of communications system 10, following the projection of direct path-time delayed pulse 350 and delay path-primary pulse 360 unto imager 270 to provide interference fringe pattern, second optical communication apparatus 200 switches to the transmit mode (that is, the communications apparatus that has just received a signal from another station responds by transmitting a reply signal). The processing of the interference fringe pattern on imager 270 (such as reading out the pixels of the imager array to provide the signals to code key generator 290) need not be accomplished before second assembly is shifted to the transmit mode. In shifting to the transmit mode, optical signal generator 210 generates a return pulse of light that corresponds to the primary pulse generated by first assembly during the just completed first assembly transmit cycle, that is, the return pulse is of the same wavelength, amplitude, and duration as the primary pulse of first assembly. Second assembly optical path director 246 (FIG. 1) is shifted to the transmit position so that the return pulse enters second assembly time delay unit 220, with one portion passing along the direct path and a second portion passing along the delay path so that second assembly 200 generates a second assembly optical output signal comprising a primary pulse and a time delay pulse that is then transmitted to first assembly 100. To ensure that the return pulse is transmitted through substantially identical conditions as the pulse from first assembly 100 (particularly with respect to transmissions through free space), it is desirable that the return pulse be transmitted from second assembly 200 back to first assembly as soon as possible, and preferably within a few (e.g., less than 10) nanoseconds.

Processing the second assembly optical output signal in first assembly 100 is accomplished in the same fashion as described above for the processing of the received signal in second assembly 200. The interference fringe pattern formed on first assembly imager similarly is the result of the combination of a light pulse having the phase shift of second assembly time delay unit and a light pulse having the phase shift the first assembly time delay unit. Further, the position of this interference fringe pattern with respect the reference standard on first assembly imager 170 (the respective first and second imagers 170, 270 having a common or known reference standard that can be correlated) is the same as that formed in the second assembly imager. Processing of this spatial relationship data in first assembly code key generator 190 thus provides the identical unique code key data values as are generated in the second assembly. Unique, random, code key data values can thus be developed between stations without either station having knowledge of the other station's phase shift (or delay path lengths) in a manner that is not able to be replicated by a third station intercepting or otherwise accessing the signals exchanged between the first and second stations.

Dependent on the number of code key data values (or bits) needed to construct a key appropriate for the secure exchange of information, multiple transmit-receive iterations between the first and second communication assemblies can be used to provide the required number of code key values. For each iteration, operation of the system would be as described above, with the exception that the phase shift in at least one, and alternatively both communication assemblies, would be modified between each iteration. Such modification is accomplished by changing the delay path length, as described above, or alternatively shifting the phase of light passing through the respective time delay unit with delay path reset device 148 (FIG. 1). The change in phase shift results in different interference fringe pattern projections on the respective imagers of the two communication assemblies. Each transmit-receive iteration between first and second communication assemblies 100, 200 provides additional code key data values.

While only certain features of the invention have been illustrated and described herein, many modifications and changes will occur to those skilled in the art. It is, therefore, to be understood that the appended claims are intended to cover all such modifications and changes as fall within the true spirit of the invention.

What is claimed is:

1. An optical communications system adapted for secure key exchange between stations having respective optical communications assemblies, the communications system comprising:

a first and a second optical communications assembly, said assemblies being optically coupled together via an optical coupling medium, each of said optical communications assemblies comprising:

a respective time delay unit;

an optical pattern imager optically coupled to said respective time delay unit;

a respective transmission-reception apparatus optically coupled to said time delay unit and disposed so as to couple said first optical communications assembly via said optical coupling medium; and a respective optical signal generator coupled to said respective time delay unit for passing an optical signal through said time delay unit, said optical signal comprising a pulse of coherent light.

2. The system of claim 1 wherein each of said time delay units comprises:

a pair of beamsplitters coupled together and disposed such that a first beamsplitter of said pair is further disposed so as to be optically coupled to said optical signal generator along a first axis of said time delay unit and a second beamsplitter of said pair is disposed so as to be optically coupled to transmission-reception apparatus disposed along said first axis; and a delay path apparatus having a first optical deflector optically coupled to said first beamsplitter and a second optical deflector optically coupled to said first optical deflector and to said second beamsplitter;

said pair of beamsplitters being optically coupled to said delay path apparatus such that a portion of an optical signal entering said time delay unit along the time delay unit first axis is passed along a direct path between said pair of beamsplitters and thence out of said time delay unit, and another portion of said optical signal entering said time delay unit along said first axis is deflected along a delay path through said delay path apparatus before passing from said time delay unit.

3. The system of claim 2 wherein each of said optical pattern imagers is coupled to the respective first beamsplitter of said respective optical time delay unit so as to receive light passing therefrom.

4. The system of claim 3 wherein each respective time delay unit further comprises an optical path director disposed along said delay path so as to selectively deflect light passing along said delay path between a transmit path and a receive path.

5. The system of claim 4 wherein said optical path director comprises a prism comprising an eletro optic material having an index of refraction responsive to an applied signal.

6. The system of claim 4 wherein said optical path deflector comprises a displacement mechanism coupled to said first optical deflector.

7. The system of claim 4 further comprising a transmit-receive controller.

8. The system of claim 2 wherein each of said delay path apparatus further comprises a delay path reset device optically coupled in said delay path so as to selectively shift the phase of light passing along said delay path.

9. The system of claim 8 wherein said delay path reset device comprises a liquid crystal cell.

10. The system of claim 1 wherein said optical signal generator comprises a laser.

11. The system of claim 10 wherein each of said optical signal generator further comprises an injection locked oscillator coupled to said laser so as cause said laser to generate a light pulse having the same wavelength and duration as light pulse incident on said optical signal generator.

12. The system of claim 10 wherein said laser is adapted so as to generate pulses of coherent light at a wavelength in the range between about 2 micron and 500 nm.

13. The system of claim 1 wherein each of said respective transmission-reception apparatuses comprises beam coupling optics adapted for optimal transmission of said optical signal in said optical coupling medium.

14. The system of claim 13 wherein said optical coupling medium comprises free space and said beam coupling optics comprise telescopic optics for widening the beam width of said optical signal passing from the respective time delay unit to which said telescopic optics are coupled.

15. The system of claim 13 wherein said optical coupling medium comprises optical transmission fibers and said beam coupling optics comprise lenslets for focusing said optical signal passing from the respective time delay unit to which said beam coupling optics are coupled onto optical transmission fibers.

16. The system of claim 1 wherein each of said respective optical pattern imagers comprise a plurality of light-sensitive pixels disposed in an array, each array of pixels having a corresponding reference standard.

17. The system of claim 16 wherein each optical communications assembly further comprises a code-key generator coupled to said respective optical pattern imager such that a signal corresponding to the position of an interference pattern imaged on said optical pattern imager with respect to the reference standard thereof is generated to provide a code-key data signal.

18. The system of claim 2 wherein the respective delay path in each of said time delay units is of a different length.

19. A method of secure exchange of a code key between a first optical communication assembly at one station and a second optical communication assembly at a second station in an optical communication system, the method comprising the steps of:

generating in each of said first and second optical communication assemblies a code-key interference pattern corresponding to combination of a first optical communication assembly phase shift and a second optical communication assembly phase shift; and generating in each of said optical communication assemblies a code key data value corresponding to the spatial relation on an imager of said code-key interference pattern with respect to a common reference standard.

20. The method of claim 19 wherein the step of generating said interference pattern further comprises the steps of:

generating in said first optical communication assembly a first assembly output optical signal, said first assembly optical signal comprising two pulses of coherent light, one of said pulses being a respective assembly primary pulse and the other pulse being a respective assembly time-delayed pulse, the time between said two pulses corresponding to said first optical communication assembly optical phase shift;

processing in said second optical communication assembly the received first assembly output optical signal so as to generate said code-key interference pattern on a second optical communication assembly optical pattern imager;

generating in said second optical communication assembly a second assembly output optical signal, said second assembly output optical signal comprising two pulses of coherent light, one of said pulses being a respective assembly primary pulse and the other pulse being a respective assembly time-delayed pulse, the time between said two pulses corresponding to said second optical communication assembly phase shift;

processing in said first optical communication assembly the received second assembly output optical signal so as to generate said code-key interference pattern on a respective optical communication assembly optical pattern imager.

21. The method of claim 20 wherein the step of generating said respective first and second assembly output optical signals each comprises the step of passing said primary pulse of coherent light through a respective assembly time delay unit so as to generate the respective assembly time-delayed light pulse.

22. The method of claim 21 wherein the steps of processing the respective received optical communication assembly output optical signals so as to generate said code-key interference pattern on the respective optical communication assembly optical pattern imager comprises the step of:

passing said received optical communication assembly output optical signal through the respective time delay unit in the receiving optical communication assembly so as to generate said interference pattern on the respective optical communication assembly optical pattern imager, the position of said code-key interference pattern on said respective pattern imager with respect to an imager pattern reference standard corresponding to the sum of the optical phase shift introduced by the respective first and second optical communication assembly time delay units.

23. The method of claim 22 wherein the step of passing the received output optical signal through the receiving optical communication assembly time delay unit to generate said interference pattern further comprises optically combining the time-delayed light pulse received from the transmitting optical communications assembly with the primary pulse received from the transmitting optical communications system after said primary pulse had passed along the delay path of the receiving optical communications assembly.

24. The method of claim 23 wherein the step of optically combining pulses further comprises offsetting the path of the transmitting optical assembly primary pulse by a selected offset angle as it passes from the delay path of the receiving optical communications assembly time delay unit so as to provide a predetermined interference pattern spacing on said respective imager.

25. The method of claim 20 wherein the steps of generating in each of said optical communication assemblies a respective output optical signal further comprises transmitting said output optical signal to the other respective optical communication assembly.

26. The method of claim 25 wherein in the step of transmitting said respective output optical signal comprises passing said signal through free space.

27. The method of claim 25 wherein in the step of transmitting said respective output optical signal comprises passing said output optical signal along fiber optic lines.

28. The method of claim 20 wherein the step of generating the first optical communication assembly optical output signal comprises generating said primary pulse with a laser.

29. The method of claim 28 wherein the step of generating said second optical communication assembly optical output signal comprises reflecting the primary pulse received from said first optical communication assembly and that has passed through said second optical communications assembly time delay unit undelayed.

30. The method of claim 19 wherein the step of generating in each respective optical communication assembly said code key data value comprises the steps of generating an electrical signal from an array of pixels, said electrical signal corresponding to the spatial relation of said code-key interference pattern with respect to said common reference standard.

* * * * *